US009189639B2

(12) United States Patent
Tokumoto (10) Patent No.: US 9,189,639 B2
(45) Date of Patent: Nov. 17, 2015

(54) DATA PROCESSING APPARATUS AND METHOD FOR CONTROLLING SAME

(75) Inventor: Yoko Tokumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 13/338,976

(22) Filed: Dec. 28, 2011

(65) Prior Publication Data

US 2012/0188597 A1 Jul. 26, 2012

(30) Foreign Application Priority Data

Jan. 25, 2011 (JP) ................................. 2011-013371

(51) Int. Cl.
*G06F 21/60* (2013.01)
*H04N 1/32* (2006.01)
*G06F 3/06* (2006.01)
*G06F 3/12* (2006.01)

(52) U.S. Cl.
CPC .......... *G06F 21/608* (2013.01); *H04N 1/32122* (2013.01); *G06F 3/0652* (2013.01); *G06F 3/1222* (2013.01); *G06F 3/1229* (2013.01); *G06F 3/1267* (2013.01); *G06F 3/1274* (2013.01); *G06F 2221/2143* (2013.01); *H04N 2201/218* (2013.01); *H04N 2201/3202* (2013.01)

(58) Field of Classification Search
USPC .................... 358/1.15, 1.16; 380/45; 711/159
See application file for complete search history.

(56) References Cited

U.S. PATENT DOCUMENTS

| | | | | |
|---|---|---|---|---|
| 2003/0079078 | A1* | 4/2003 | Zipprich et al. | 711/112 |
| 2004/0267782 | A1* | 12/2004 | Nakano et al. | 707/100 |
| 2009/0083347 | A1* | 3/2009 | Haga | 707/206 |
| 2009/0196417 | A1* | 8/2009 | Beaver et al. | 380/45 |
| 2009/0307597 | A1* | 12/2009 | Bakman | 715/736 |
| 2010/0134836 | A1* | 6/2010 | Hasegawa | 358/1.15 |
| 2010/0138619 | A1* | 6/2010 | Benavides | 711/159 |

FOREIGN PATENT DOCUMENTS

JP 2005-236782 A 9/2005

* cited by examiner

*Primary Examiner* — Miya J Cato
*Assistant Examiner* — Temitayo Folayan
(74) *Attorney, Agent, or Firm* — Fitzpatrick, Cella, Harper & Scinto (57) ABSTRACT

A data processing apparatus of this invention, which has a storage unit, includes a deletion unit that deletes user data stored in the storage unit. The data processing apparatus further includes a generation unit that generates status information indicating presence or absence of the user data in a storage area that each of a plurality of addresses assigned to the storage unit indicates, and a presentation unit that presents an image according to the status information, to a user.

6 Claims, 7 Drawing Sheets

DATA PROCESSING APPARATUS AND METHOD FOR CONTROLLING SAME

BACKGROUND OF THE INVENTION

1. Field of the Invention

The present invention relates to a data processing apparatus for processing user data such as a setting value and image data, and to a method for controlling the same.

2. Description of the Related Art

Digital multi-function peripherals are equipped with storage devices (HDD, SSD, SRAM, and the like). User data generated when a user utilizes the digital multi-function peripheral, in addition to a program necessary for operation of the digital multi-function peripheral and adjustment value of the digital multi-function peripheral, is saved in the storage devices. Since information such as image data, an address book, and the setting value is confidential user information, when a rented digital multi-function peripheral is taken back (after rental), and then is reused or replaced, collective deletion of the user data saved in the storage devices of the digital multi-function peripheral is performed so that the previous confidential user information is not leaked.

In previous digital multi-function peripherals not having a collective deletion of the user data function, in order to prevent the leakage of the data saved in an HDD when it is returned after rental or the like, if the customer demands, the HDD has to be physically destroyed. However, this work must be performed by a technician. Further, since it is necessary to confirm that the data is actually erased (destroyed), there has been a problem in that it is very labor-intensive. Therefore, in current digital multi-function peripherals, it is common to have a collective deletion of user data function for initializing, by a user operation, the user data in the digital multi-function peripheral including an HDD.

In the collective deletion function of the user data, only the information (user data) related to a user such as image data and an address book is deleted, and the deletion of the data other than the user data, such as an adjustment value inherent in the digital multi-function peripheral and a program, by which a security problem does not occur even by leakage is not performed. Thereby, it is possible to minimize the trouble necessary for resetting and reinstallation at the time of reuse of the digital multi-function peripheral. In view of deleting only the user data, and not erasing a digital multi-function peripheral setting file other than the user data and the like, a method realized by an initialization sequence is proposed (for example, see Japanese Patent Laid-Open No. 2005-236782).

However, according to the above-described conventional art, when the collective deletion of the user data is performed, the adjustment value inherent in the digital multi-function peripheral and any software programs remain in the digital multi-function peripheral. Then, the user cannot confirm independently that the user data is erased for certain. Particularly, since a user that is very concerned about information security may feel anxious about whether user data is actually collectively deleted or not, it is desired to indicate, by any means, to the user that the user data is erased for certain. Further, when the user data is confidential information, it is assumed that this is still a high requirement.

Here, as a method for confirming that the user data is deleted, information indicating the state of a data area of a storage unit of the digital multi-function peripheral, such as a file size and checksum of the storage area (data area), can be generated and compared with that at the time of factory shipment. However, in an image forming apparatus of a digital multi-function peripheral or the like, an adjustment value of the apparatus, stored in a storage unit, may be changed while it is operated by a user, and it is difficult to apply this method simply.

SUMMARY OF THE INVENTION

The present invention has been made in view of the above-described problems. The present invention provides a mechanism by which a user can confirm easily whether or not user data is actually deleted by performing a function which deletes the user data.

According to one aspect of the present invention, there is provided a data processing apparatus having a storage unit, comprising: a deletion unit that deletes user data stored in the storage unit; a generation unit that generates status information indicating presence or absence of the user data in a storage area that each of a plurality of addresses assigned to the storage unit indicates; and a presentation unit that presents an image according to the status information, to a user.

According to another aspect of the present invention, there is provided a method for controlling a data processing apparatus having a storage unit, comprising: deleting user data stored in the storage unit; generating status information indicating presence or absence of the user data in a storage area that each of a plurality of addresses assigned to the storage unit indicates; and presenting an image according to the status information, to a user.

According to the present invention, a mechanism is provided by which the user can confirm easily whether or not the user data is actually deleted by performing function which deletes the user data.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Overall Configuration of an Image Forming Apparatus>

Figure 1:
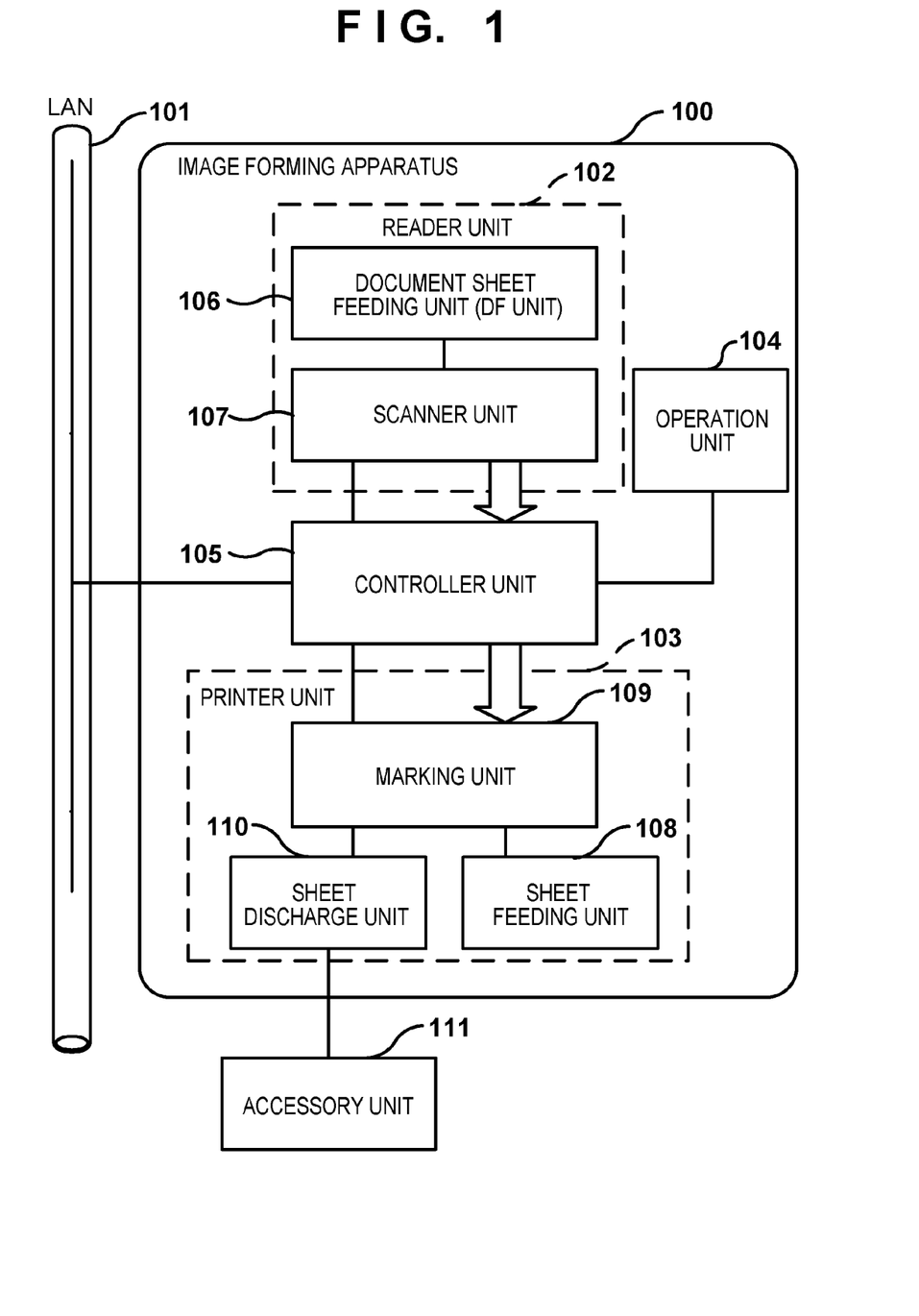
FIG. 1 is a view showing an overall configuration of an image forming apparatus according to one embodiment of the present invention.

With reference to FIG. 1, an overall configuration of an image forming apparatus 100 will be described below. The image forming apparatus 100 is one example of a data processing apparatus according to the present invention. The image forming apparatus 100 is connected to the Internet via a Local Area Network (LAN) 101 such as Ethernet (registered trademark), or the like. The image forming apparatus 100 includes: a reader unit 102 that performs the processing for reading image data; a printer unit 103 that performs the processing for outputting the image data; an operation unit 104 having a liquid crystal panel that performs the display of the image data and various functions, and the like; and a controller unit 105 made up of a single electronic part connected to each of these components to control the components.

The reader unit 102 includes a document sheet feeding unit 106 that conveys a document sheet, and a scanner unit 107 that reads optically an image of the document to convert it into electronic image data.

The printer unit 103 includes a sheet feeding unit 108 having multi-stage sheet feeding cassettes that contains a printing sheet, a marking unit 109 that transcribes and fixes the image according to the image data, on the printing sheet, and a sheet discharge unit 110 that transfers the printing sheet on which the image is formed, to the outside of the unit.

The sheet discharge unit 110 may be connected to an accessory unit 111 outside the forming apparatus 100. In that case, the printing sheet is discharged into the accessory unit 111. The accessory unit 111 performs, for the printing sheet, finishing processing such as sort processing and staple processing and then discharges the printing sheet. When the image forming apparatus 100 has a FAX function, a FAX transmission unit is provided in the accessory unit 111. Also, in the present embodiment, although the accessory unit 111 is separate from the image forming apparatus 100, the image forming apparatus 100 itself may include the accessory unit 111.

<Detailed Configuration of the Controller Unit>

Figure 2:
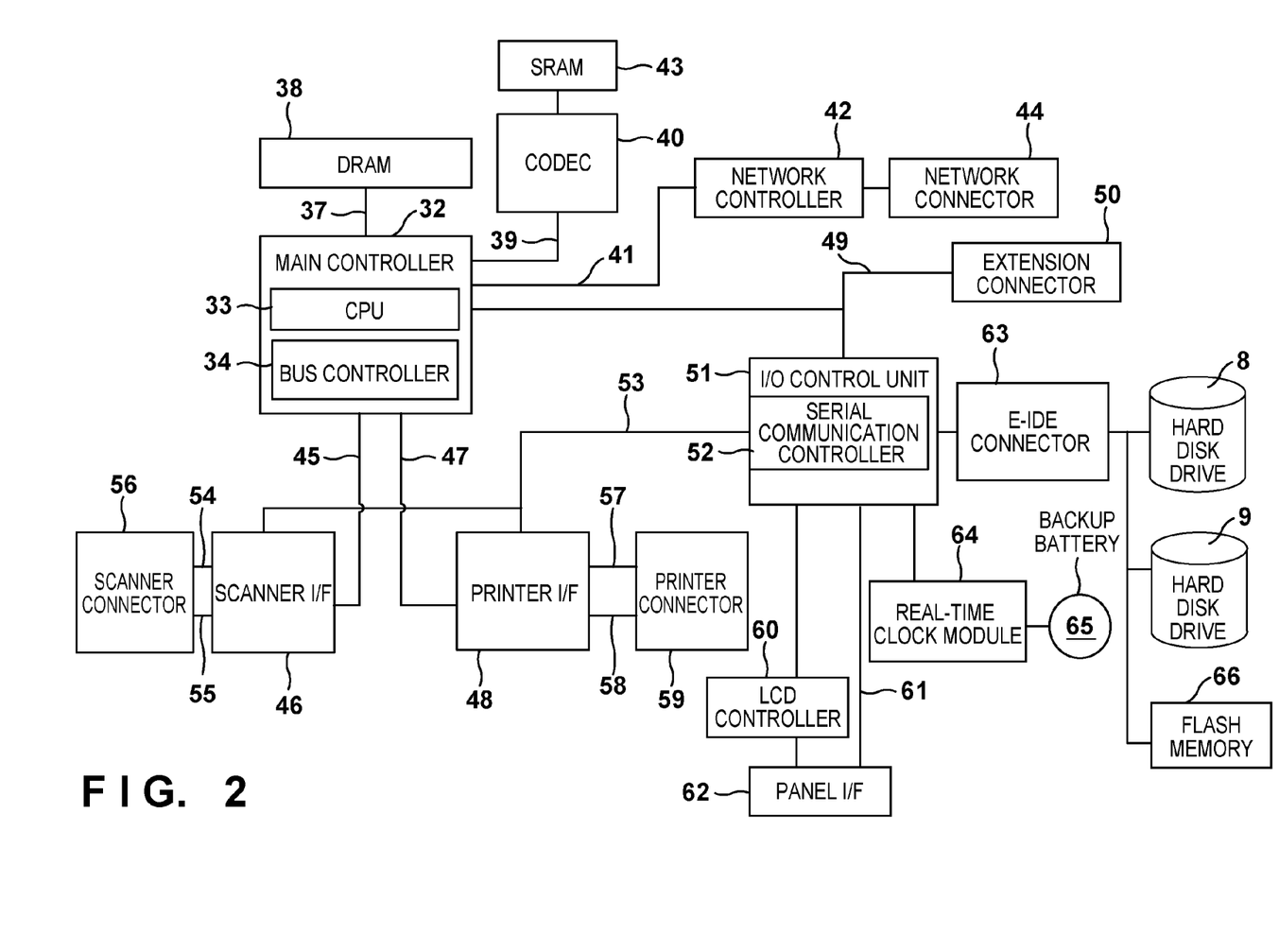
FIG. 2 is a block diagram showing a detailed configuration of a controller unit.

FIG. 2 is a block diagram showing the details of a controller unit 105. A main controller 32 includes a CPU 33, a bus controller 34, and a functional block having various controller circuits as described below. The CPU 33 is connected to a DRAM 38 via a DRAM interface (I/F) 37. The CPU 33 is connected to a codec 40 via a codec I/F 39, and further to a network controller 42 via a network I/F 41.

The DRAM 38 is used as a work area for the CPU 33 to operate, and as an area for storing image data. The codec 40 compresses raster image data stored in the DRAM 38 by a well-known compression scheme such as MH/MR/MMR/JBIG, and also decompresses the compressed data into a raster image. An SRAM 43 is connected to the codec 40, and the SRAM 43 is used as a temporary work area for the codec 40.

The network controller 42 controls, via a network connector 44, the communication between the network controller 42 and other devices connected to the LAN 101. The main controller 32 is connected to a scanner I/F 46 via a scanner bus 45, and to a printer I/F 48 via a printer bus 47. The main controller 32 is connected to an extension connector 50 for connecting an extension board and an input/output control unit (I/O control unit) 51, via a general-purpose high-speed bus 49 such as a PCI bus or the like.

The I/O control unit 51 is equipped with a two-channel asynchronous serial communication controller 52 having two channels for transmitting/receiving a control command between the I/O control unit 51, and the reader unit 102 and the printer unit 103. The serial communication controller 52 is connected to the scanner I/F 46 and the printer I/F 48 via an I/O bus 53.

The scanner I/F 46 is connected to a scanner connector 56 via a first asynchronous serial I/F 54 and a first video I/F 55.

The scanner connector 56 is connected to the scanner unit 107 of the reader unit 102. The scanner I/F 46 performs, for image data received from the scanner unit 107, desired binarization processing, and scaling processing in the main-scanning direction and/or sub-scanning direction. The scanner I/F 46 generates a control signal based on a video signal sent from the scanner unit 107, and transfers the generated signal to the main controller 32 via the scanner bus 45. The printer I/F 48 is connected to a printer connector 59 via a second asynchronous serial I/F 57 and a second video I/F 58. The printer connector 59 is connected to the marking unit 109 of the printer unit 103. The printer I/F 48 performs smoothing processing for image data output from the main controller 32, and outputs the image data to the marking unit 109. The printer I/F 48 outputs a control signal generated based on a video signal sent from the marking unit 109, to the printer bus 47. The printer I/F 48, for example, interprets Page Description Language (PDL) data received from a host computer connected to the LAN 101, and expands the data into raster image data.

The bus controller 34 controls the data transfer between: the bus controller 34; and the scanner I/F 46, the printer I/F 48, and other external devices connected to the extension connector 50 and the like. The bus controller 34 performs the control of, the arbitration at the time of bus competition, and DMA data transfer. For example, the data transfer between the DRAM 38 and the codec 40, the data transfer from the scanner unit 107 to the DRAM 38, the data transfer from the DRAM 38 to the marking unit 109, and the like are controlled by the bus controller 34, and are performed by the DMA transfer.

The I/O control unit 51 is connected to a panel I/F 62 via an LCD controller 60 and a key input I/F 61. The I/O control unit 51 is connected to the operation unit 104 via the general-purpose high-speed bus 49. The I/O control unit 51 is connected to hard disk drives 8 and 9, and a flash memory 66 via an E-IDE connector 63. The flash memory 66 includes a storage area for storing various data such as a control program of the main controller and the like.

The I/O control unit 51 is connected to a real-time clock module 64 that updates/saves the date and time managed in the apparatus. Also, the real-time clock module 64 is connected to a backup battery 65 and power is supplied by the backup battery 65.

<Mechanism of User Data Collective Deletion>

A storage device (storage unit) which the image forming apparatus 100 can utilize and in which user data can be saved includes, the SRAM 43, the hard disk drives 8 and 9, and the flash memory 66. The SRAM 43 saves data (for example, address book data, and the like) related to a user, in addition to an adjustment value of the apparatus, and values are set to each prepared item. In the present embodiment, when the user data is collectively deleted (collectively erased), the value of the item related to the user is deleted, and the adjustment value of the apparatus is not deleted. Although the adjustment value saved in the SRAM 43 is set at the time of factory shipment, even while the image forming apparatus 100 is operated by the user, the adjustment value may be changed by a technician or the user.

Figure 3:
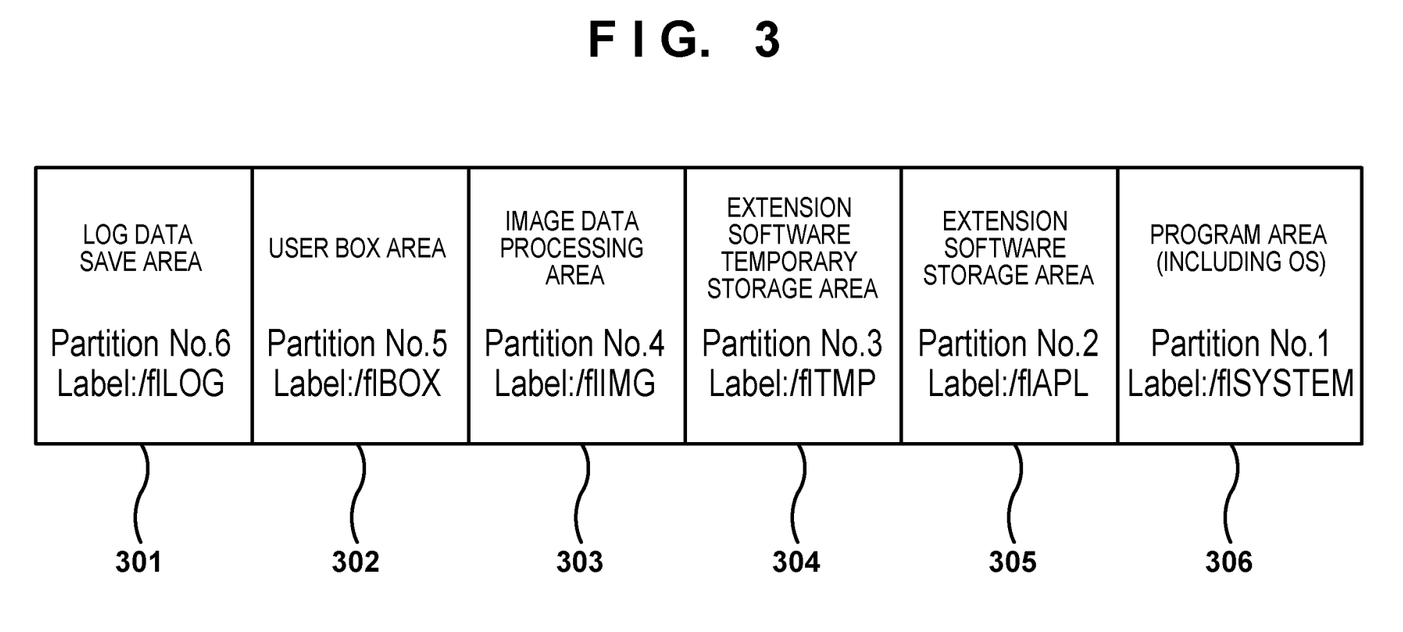
FIG. 3 is a view showing a partition configuration of a storage unit.

Although a configuration is used in which all the hard disk drives 8 and 9, and the flash memory 66 are included in the image forming apparatus 100, in the present embodiment, even when at least any one of them is an external type, the corrective deletion of the user data can be performed in a similar manner as described below. The storage areas of the hard disk drives 8 and 9, and the flash memory 66 are divided into partitions as shown in FIG. 3 to be managed. Deletion processing is performed for each partition. Those in which data deletion processing by the user data collective deletion, in the storage areas in these storage devices is performed are a log data save area 301, a user box area 302, an image data processing area 303, and an extension software temporary storage area 304. These areas 301 to 304 are areas in which the data related to the user is saved by the image forming apparatus 100, while the user uses the image forming apparatus 100.

The collective deletion of the user data is not performed for an extension software storage area 305 that saves a license and the like, and a program area 306 that saves a program including OS. Even while the image forming apparatus 100 is operated by the user, when the addition of the license and the update of the program are performed, the extension software storage area 305 and the program area 306 may be changed by the technician or the user.

<Method for Generating Data Area Use-status Information>

Figure 4:
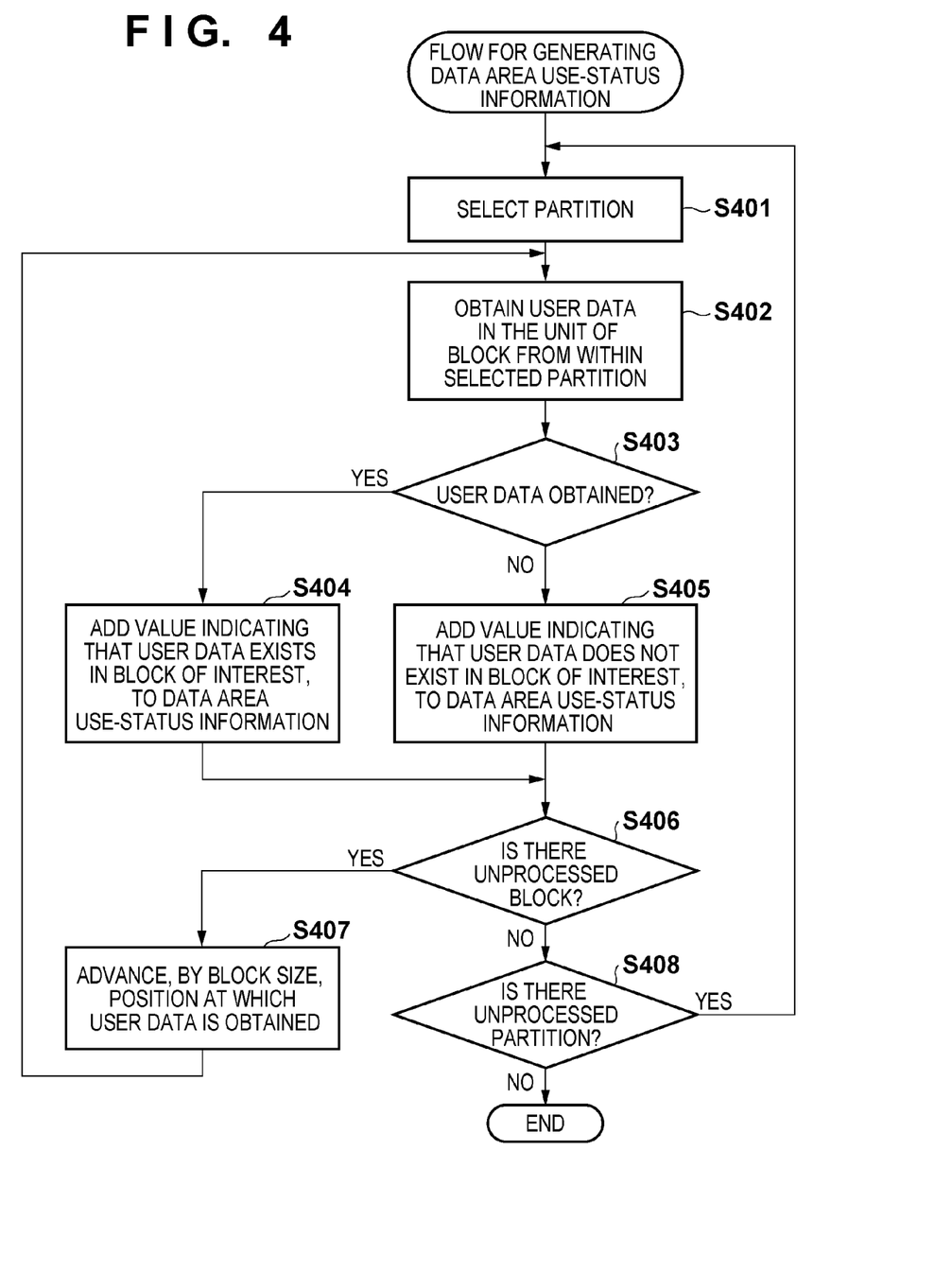
FIG. 4 is a flow chart showing the processing for generating data area use-status information.

With reference to the flow chart of FIG. 4, a method for generating data area use-status information will be described. Also, in the present embodiment, the data area use-status information is one example of the status information, according to the present invention, indicating the presence or absence of the user data in the storage area that each of a plurality of addresses assigned to the storage unit indicates. The flow chart as shown in FIG. 4 is performed by the CPU 33, in accordance with the program stored in the flash memory 66 as shown in FIG. 2. The objects of this processing are the SRAM 43, the hard disk drives 8 and 9, and a flash memory 66.

First, the CPU 33 selects a partition of the storage area in each storage device in S401. Also, since no partition exists in the SRAM 43, the entire SRAM 43 is selected.

Figure 5A:
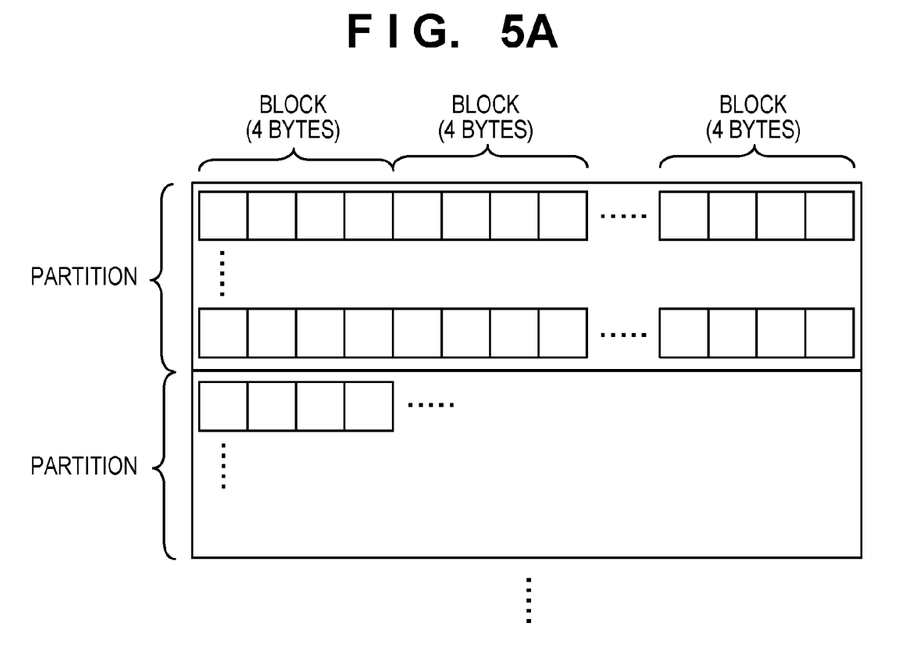
FIG. 5A is a view showing one example of blocks in a partition of the storage unit.

Then, in S402, the CPU 33 tries to obtain the user data in the unit of block from within the partition selected in S401. The unit of block is a size in which the partition is sufficiently subdivided, each suitable block size is preset for each partition different in size. The positional information (address) for specifying each block is assigned to each block. For example, as shown in FIG. 5A, the size per block is four bytes.

Figure 5B:
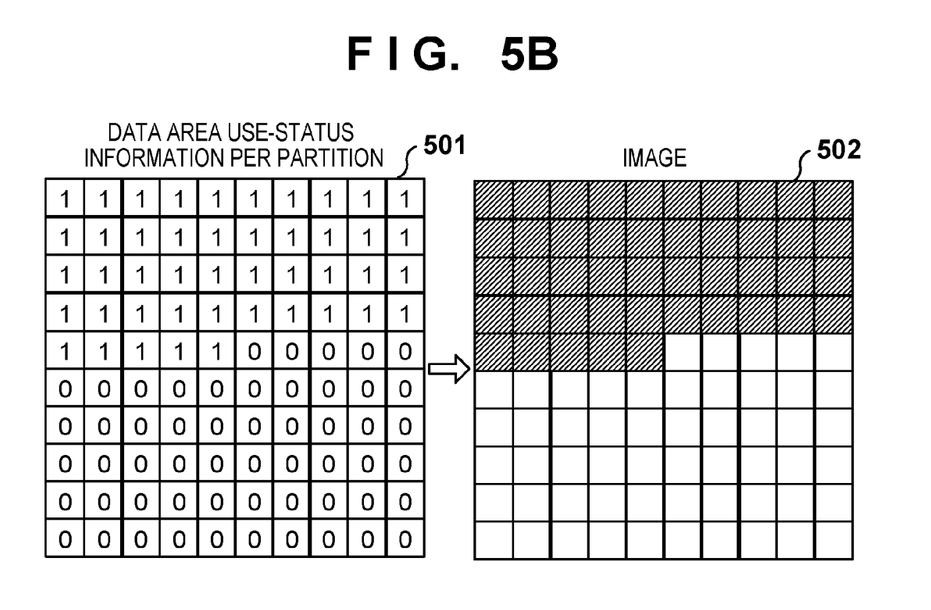
FIG. 5B is a view showing one example of the data area use-status information and the corresponding image.

Then, in S403, the CPU 33 determines whether or not the user data is obtained from within the block of interest in S402. When the user data is obtained, the CPU 33 adds the value indicating that the user data exists in the block of interest, to the data area use-status information, in S404. FIG. 5B shows text data 501 described in text form, and an image 502 corresponding to the text data 501 that indicate the presence or absence of the user data in each block, specified by each of a plurality of addresses, as one example of the data area use-status information. When the user data is obtained, the CPU 33 adds "1" as the value indicating that the user data exists in the block of interest, to the text data 501 corresponding to the data area use-status information as shown in FIG. 5B, for example, in S404.

On the other hand, when the user data is not obtained, the CPU 33 adds the value indicating that the user data does not exist in the block of interest, to the data area use-status information, in S405. For example, as shown in FIG. 5B, the CPU 33 adds "0" as the value indicating that the user data does not exist in the block of interest, to the text data 501 corresponding to the data area use-status information.

Also, in the processing of S404 and S405, if "0" is set as the default value of the text data 501, it is possible to omit S405, and if "1" is set, it is possible to omit S404.

In this manner, the CPU 33 adds continuously the presence or absence of the user data for each block in the storage area (data area) of each storage device, and thereby generates the data area use-status information (text data 501) associating the positional information (address) on the data area, with the presence or absence of the user data in the block specified by the address.

When the CPU 33 determines the presence or absence of the user data in the unit of block and adds a value to the data area use-status information, the CPU 33 proceeds to S406 and determines whether or not there is an unprocessed block in the partition selected in S401. In the present embodiment, when a fraction is generated in the data area, the fraction also is treated as one block. For example, in the case of using four bytes as one block, when the data area of 102 bytes exists in a partition, although the fraction of two bytes is generated, these two bytes are treated as one block. However, if processing speed is important, it is also possible not to treat the fraction as block.

When there is the unprocessed block, in S407, the CPU 33 advances, by the block size, the position (address) at which the user data is obtained, and performs the processing from S402. The block size in the example of FIG. 5A is four bytes. When there is no unprocessed block, the CPU 33 proceeds to S408, and determines whether or not there is an unprocessed partition.

If there is the unprocessed partition, the CPU 33 advances processing to the next partition, and performs the processing from S401. On the other hand, if there is no unprocessed partition, the CPU 33 finishes the generation of the data area use-status information.

<Method for Presenting the Data Area Use-status Information>

Figure 6:
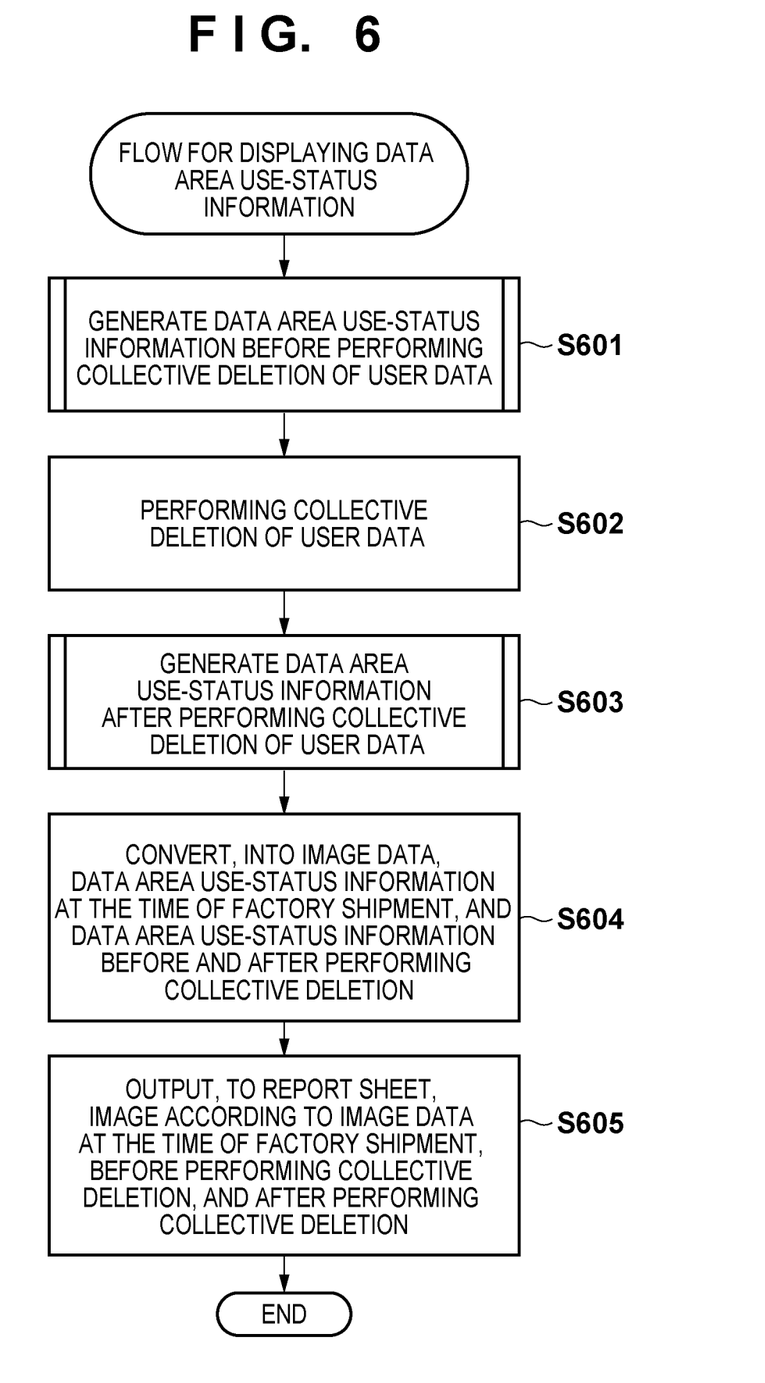
FIG. 6 is a flow chart showing the processing for displaying the data area use-status information.

With reference to the flow chart of FIG. 6, a method for obtaining the data area use-status information at the time of user data collective deletion, and for imaging it to present it to the user will be described. The flow chart as shown in FIG. 6 is performed by the CPU 33, in accordance with the program stored in the flash memory 66 as shown in FIG. 2.

The CPU 33, when receiving an instruction of collective deletion of the user data from the operation unit 104, generates data area use-status information before performing collective deletion of the user data in S601. Subsequently, the CPU 33 performs collective deletion of the user data in S602. After collective deletion, the CPU 33 generates data area use-status information after performing collective deletion of the user data in S603. Also, the processing of S601 and S603 respectively are performed in accordance with the procedure as shown in the flow chart of FIG. 4.

Then, in S604, the CPU 33 images: data area use-status information at the time of factory shipment, saved in advance in the program area 306 (excluded from the objects of collective deletion processing); and the data area use-status information before and after performing collective deletion, generated in S601 and S603, respectively.

The imaging of the data area use-status information is performed by generating, from the text data 501 corresponding to the data area use-status information, the image 502 color-coded so that the presence or absence of the user data in each block of the storage area (data area) becomes easy to be visually recognized, for example, as shown in FIG. 5B.

In S605, that in which the data area use-status information, at the time of factory shipment, before performing collective deletion, and after performing collective deletion, is imaged is printed on a printing sheet as a report sheet in the printer unit 103.

Figure 7:
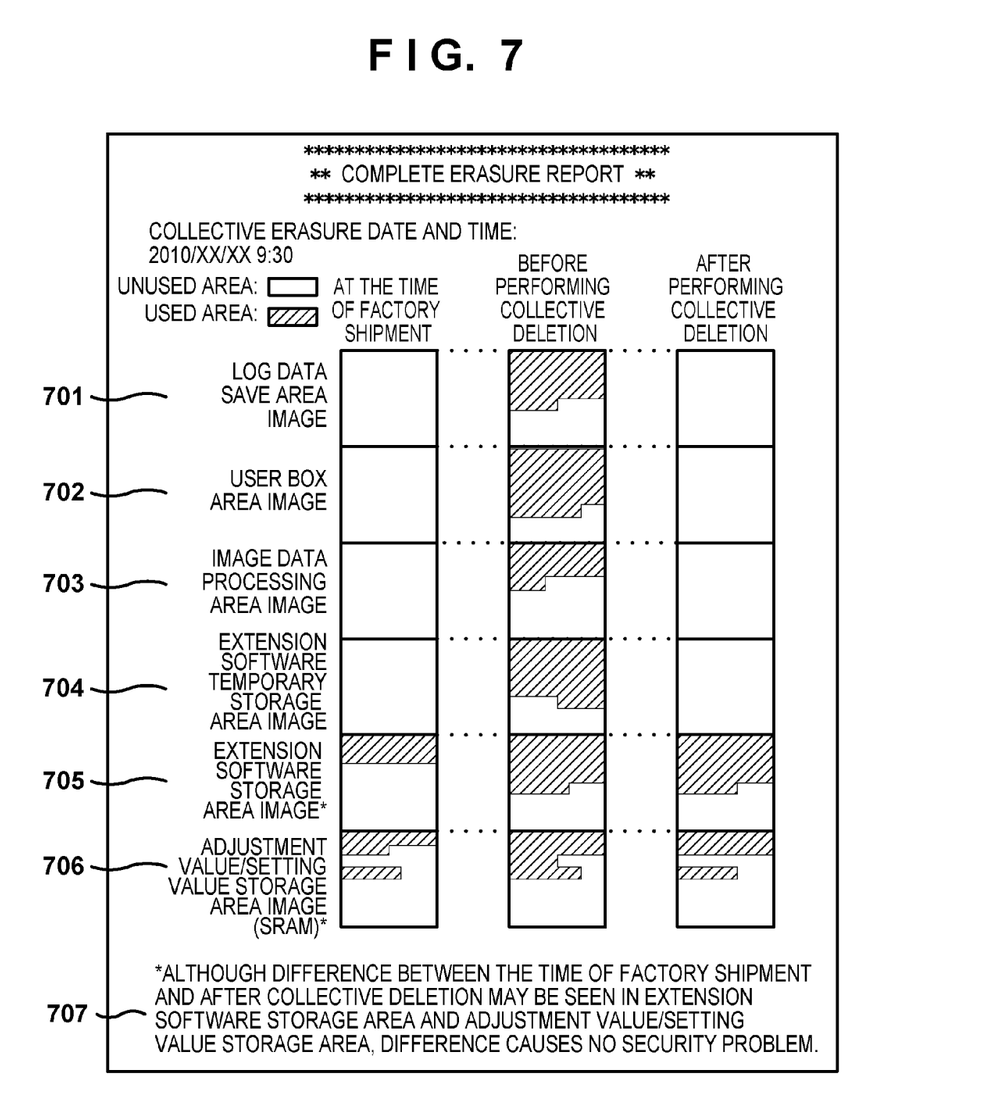
FIG. 7 is a view showing one example of a report sheet in which user data is collectively deleted.

FIG. 7 shows one example of the report sheet output after performing user data collective deletion. Printed log data area image 701, user box area image 702, image data processing area image 703, and extension software temporary storage area image 704 respectively are those in which the data area use-status information corresponding to partitions of the log data save area 301, the user box area 302, the image data processing area 303, and the extension software temporary storage area 304 of FIG. 3 is imaged. The user can visually confirm that although the data area is used before performing collective deletion, the data area is not used at the time of factory shipment and after performing collective deletion (i.e., the user data does not exist). These partitions, since being the storage areas in which the user data can be saved, are objects of the user data collective deletion. The user can independently confirm that the value of the data area is deleted by performing the collective deletion processing, and the data area after performing collective deletion becomes the state equal to that at the time of factory shipment.

An extension software storage area image 705 is that in which the data area use-status information corresponding to the partition of the extension software storage area 305 of FIG. 3 is imaged. Since no user data is saved in the extension software storage area 305, the extension software storage area 305 is excluded from the objects of the user data collective deletion. There is no difference in data area use-status information between before and after performing collective deletion, in the example of FIG. 7. While the image forming apparatus 100 is operated by the user, if the extension software storage area 305 is used, the difference in the extension software storage area image 705 between the time of factory shipment and after performing collective deletion may be generated. If there is a difference in this area between the time of factory shipment and after performing collective deletion, it is indicated to the user in a comment 707 that there is no security problem.

An adjustment value/setting value storage area image 706 is that in which the data area use-status information corresponding to the SRAM 43 is imaged. Since there is the case where the user data is saved in a part of the storage area in the SRAM 43, only the data item related to the user is deleted, at the time of performing user data collective deletion. However, the items related to the adjustment value/setting value of the apparatus are not deleted. Since the adjustment value/setting value of the apparatus may be also changed, while the image forming apparatus 100 is operated by the user, the difference in data area use-status information between the time of factory shipment and after performing collective deletion may be generated. Also in that case, in a manner similar to the extension software storage area image 705, if there is a difference in this area between the time of factory shipment and after performing collective deletion, it is indicated in a comment 707 that there is no security problem.

Further, since the partition of the program area 306 of FIG. 3, other than when the update of the program is performed, becomes the area in which it is possible to read it, but not to write it, no user data is saved. On this account, in the example of the report sheet of FIG. 7, the program area 306 is excluded from the objects of the report.

Hereinabove, by generating the report sheet as shown in FIG. 7, it is possible to cause the user to visually confirm the state in which the data is deleted independently. Further, even when any data remains in the apparatus after performing of the above-described collective deletion processing, about the storage area from which the user data may leak if the data remains, it is possible to visually indicate that the data is deleted for certain.

In the present embodiment, as shown in FIG. 7, although the embodiment indicating, by printing of the report sheet, that the user data is deleted is shown, a content similar to the content shown by the report sheet may be displayed in the operation unit 104, or the user may be otherwise notified of it. Even in such a case, it is possible to obtain the effect equal to the above-described embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-013371, filed Jan. 25, 2011, which is hereby incorporated by reference herein in its entirety.

What is claimed is:

1. An information processing apparatus comprising: a storage unit that includes a first storage area for storing user data and a second storage area for storing information related to the information processing apparatus; a deletion unit configured to delete the user data stored in the first storage area for storing user data in response to receiving an instruction for deletion of the user data; and an output unit configured to output, after the user data was deleted by the deletion unit, information indicating a use-status of the first storage area for storing user data after execution of the deletion and information indicating a use-status of the second storage area for storing information related to the information processing apparatus,
wherein the information indicating the use-status of the first storage area before the deletion by the deletion unit is configured to be displayed side-by-side with the information indicating the use-status of the first storage area after the execution of the deletion.

2. The information processing apparatus according to claim 1, wherein the output unit further outputs information indicating a use-status of the first storage area before the deletion by the deletion unit.

3. The information processing apparatus according to claim 1, wherein the output unit prints, on a sheet, the information indicating the use-status of the first storage area.

4. The information processing apparatus according to claim 1, wherein the information related to the information processing apparatus is a setting value of the information processing apparatus.

5. A method for controlling an information processing apparatus which includes a storage unit that includes a first storage area for storing user data and a second storage area for storing information related to the information processing apparatus, the method comprising: deleting the user data stored in the first storage area for storing user data in response to receiving an instruction for deletion of the user data; and outputting, after the user data was deleted, information indicating a use-status of the first storage area for storing user data after execution of the deletion and information indicating a use-status of the second storage area for storing information related to the information processing apparatus, wherein the information indicating the use-status of the first storage area before the deleting is configured to be displayed side-by-side with the information indicating the use-status of the first storage area after the deleting.

6. A non-transitory computer-readable storage medium storing a method for controlling an information processing apparatus which includes a storage unit that includes a first storage area for storing user data and a second storage area for storing information related to the information processing apparatus, the method comprising: deleting the user data stored in the first storage area for storing user data in response to receiving an instruction for deletion of the user data; and outputting, after the user data was deleted, information indicating a use-status of the first storage area for storing user data after execution of the deletion and information indicating a use-status of the second storage area for storing information related to the information processing apparatus, wherein the information indicating the use-status of the first storage area before the deleting is configured to be displayed side-by-side with the information indicating the use-status of the first storage area after the deleting.

* * * * *